US011514102B2

(12) United States Patent
Gupta et al.

(10) Patent No.: US 11,514,102 B2
(45) Date of Patent: Nov. 29, 2022

(54) METHODS AND SYSTEMS FOR DEPTH-AWARE IMAGE SEARCHING

(71) Applicant: ADOBE INC., San Jose, CA (US)

(72) Inventors: Subham Gupta, Roorkee (IN); Anuradha, HSR Layout (IN); Arnab Sil, Fooghly (IN)

(73) Assignee: Adobe Inc., San Jose, CA (US)

( * ) Notice: Subject to any disclaimer, the term of this patent is extended or adjusted under 35 U.S.C. 154(b) by 626 days.

(21) Appl. No.: 16/541,039

(22) Filed: Aug. 14, 2019

(65) Prior Publication Data

US 2021/0049203 A1  Feb. 18, 2021

(51) Int. Cl.
  *G06F 16/00*    (2019.01)
  *G06F 16/58*    (2019.01)
  (Continued)

(52) U.S. Cl.
  CPC .......... *G06F 16/5866* (2019.01); *G06F 16/51* (2019.01); *G06F 16/535* (2019.01);
  (Continued)

(58) Field of Classification Search
  CPC ...... G06F 3/017; G06F 3/0304; G06F 3/0346; G06F 3/0325; G06F 3/02; G06F 3/0236; G06F 3/03545; G06F 3/04812; G06F 3/04842; G06F 3/04845; G06F 3/1423; G06F 2203/0381; G06F 2203/0383; G06F 3/011; G06F 3/03547; G06F 3/1454; G06F 9/451; G06F 3/013; G06F 3/0425; G06F 3/147; G06F 2203/04806; G06F 16/583; G06F 16/5866; G06F 3/005; G06F 16/51; G06F 16/532; G06F 16/535; G06F 16/739; G06F 3/04815; G06F 3/0482; G06F 3/0485; G06F 16/3326; G06F 16/538; G06F 16/56; G06F 16/58; G06F 16/5838; G06F 16/5854; G06F 1/3231; G06F 1/3265; G06F 21/32; G06F 21/44; G06F 2221/2113;
  (Continued)

(56) References Cited

U.S. PATENT DOCUMENTS 6,470,336 B1 * 10/2002 Matsukawa ............. G06F 16/93
  382/229
10,007,860 B1 * 6/2018 Fotland .................... G06T 7/11
  (Continued)

*Primary Examiner* — Yicun Wu
(74) *Attorney, Agent, or Firm* — Shook, Hardy & Bacon L.L.P.

(57) ABSTRACT

Embodiments provide systems, methods, and non-transitory computer storage media for providing search result images based on associations of keywords and depth-levels of an image. In embodiments, depth-levels of an image are identified using depth-map information of the image to identify depth-segments of the image. The depth-segments are analyzed to determine keywords associated with each depth-segment based on objects, features, or content in each depth-segment. An image depth-level data structure is generated by matching keywords generated for the entire image with the keywords at each depth-level and assigning the depth-level to the keyword in the image depth-level data structure for the entire image. The image depth-level data structure may be queried for images that contain keywords and depth-level information that match the keywords and depth-level information specified in a search query.

20 Claims, 10 Drawing Sheets

(51) Int. Cl.
*G06T 7/50* (2017.01)
*G06T 7/70* (2017.01)
*G06K 9/62* (2022.01)
*G06T 7/194* (2017.01)
*G06F 16/51* (2019.01)
*G06F 16/56* (2019.01)
*G06F 16/535* (2019.01)
*G06F 40/205* (2020.01)
*G06V 10/20* (2022.01)
*G06V 10/40* (2022.01)
*G06F 40/242* (2020.01)

(52) U.S. Cl.
CPC ............ *G06F 16/56* (2019.01); *G06F 40/205* (2020.01); *G06K 9/6261* (2013.01); *G06T 7/194* (2017.01); *G06T 7/50* (2017.01); *G06T 7/70* (2017.01); *G06V 10/20* (2022.01); *G06V 10/40* (2022.01); *G06F 40/242* (2020.01); *G06T 2207/20081* (2013.01); *G06T 2207/20084* (2013.01)

(58) Field of Classification Search
CPC ............ G06F 2221/2151; G06F 3/012; G06F 40/205; G06F 40/242; G06F 40/30; G06T 2207/20; G06T 2207/10024; G06T 2207/10028; G06T 7/50; G06T 7/11; G06T 2207/10016; G06T 2207/10012; G06T 2207/20081; G06T 2207/30196; G06T 7/0012; G06T 19/0021; G06T 7/194; G06T 7/55; G06T 7/593; G06T 15/20; G06T 17/00; G06T 1/20; G06T 2207/10052; G06T 2207/10081; G06T 2207/20084; G06T 2207/30101; G06T 5/20; G06T 7/187; G06T 7/557; G06T 7/60; G06T 7/70; G06T 7/74; G06T 7/75; G06T 11/008; G06T 15/04; G06T 15/08; G06T 15/205; G06T 15/503; G06T 15/506; G06T 17/10; G06T 1/00; G06T 2200/04; G06T 2207/10004; G06T 2207/10021; G06T 2207/10064; G06T 2207/10068; G06T 2207/10112; G06T 2207/10132; G06T 2207/20132; G06T 2207/30024; G06T 2207/30061; G06T 2207/30064; G06T 2207/30096; G06T 2207/30201; G06T 2211/436; G06T 2215/12; G06T 3/4023; G06T 3/4038; G06T 7/13; G06T 7/155; G06T 7/564; G06T 7/62; G06T 7/73; G06T 7/80; G06T 7/85; G06T 11/001; G06T 11/60; G06T 13/40; G06T 19/20; G06T 2200/08; G06T 2207/10048; G06T 2207/20016; G06T 2207/20028; G06T 2207/20076; G06T 2207/10101; G06T 2207/20182; G06T 2207/20228; G06T 2207/30172; G06T 2207/30204; G06T 2207/30244; G06T 2210/41; G06T 2219/2012; G06T 5/002; G06T 5/005; G06T 5/50; G06T 7/149; G06T 7/20; G06T 7/246; G06T 7/521; G06T 7/586; G06V 40/107; G06V 10/50; G06V 40/20; G06V 40/113; G06V 20/64; G06V 10/245; G06V 40/28; G06V 40/10; G06V 10/40; G06V 40/103; G06V 10/44; G06V 40/172; G06V 40/23; G06V 10/28; G06V 10/62; G06V 20/653; G06V 40/16; G06V 40/45; G06V 10/20; G06V 10/22; G06V 10/25; G06V 10/454; G06V 10/46; G06V 10/467; G06V 10/478; G06V 10/56; G06V 10/752; G06V 10/758; G06V 10/759; G06V 20/10; G06V 20/647; G06V 20/70; G06V 40/166; G06V 40/171

See application file for complete search history.

(56) References Cited

U.S. PATENT DOCUMENTS

| | | | |
|---|---|---|---|
| 2012/0113109 A1* | 5/2012 | Lee | G06T 17/00 382/154 |
| 2014/0002609 A1* | 1/2014 | Kim | H04N 13/254 348/46 |
| 2014/0267243 A1* | 9/2014 | Venkataraman | G06T 1/20 345/419 |
| 2019/0213435 A1* | 7/2019 | Nikhara | G06T 7/50 |
| 2020/0057778 A1* | 2/2020 | Sun | G06F 16/538 |

* cited by examiner

| Search Query 702 | Intent 704 | Search Query Map 706 |
|---|---|---|
| Bridge | PositionQuery = 0 | Keywords = [bridge] |
| Mountain | PositionQuery = 0 | Keywords = [mountain] |
| mountain in background | PositionQuery = 1 | Keywords = [(mountain, level=2)] |
| Boy in front of bridge | PositionQuery = 1 | Keywords = [(boy, level=1), (bridge, level=2)] |
| Bridge and mountain behind boy | PositionQuery = 1 | Keywords = [(boy, level=1), (bridge, level=2), (mountain, level=2)] |

METHODS AND SYSTEMS FOR DEPTH-AWARE IMAGE SEARCHING

BACKGROUND

Today, users have gigabytes of storage space to collect and save thousands of images on their devices using local or cloud storage solutions. Due to the abundance of images, it can be difficult for users to locate images with certain content or features. However, search functionality in image-based storage applications and services is a common feature. Popular image sharing applications include searching tools such as dedicated search engines. The search functions integrated in these applications and services typically allow a user to type keywords in a search bar and automatically display all related images found in the user's catalog based on the image tags or labels. Typically, these applications use machine learning algorithms to automatically tag images. These tags describe the content of an image with relevant keywords. Thus, when a user types a keyword search in the search bar of an image sharing application, the application returns resulting images that match any of the identified keywords. These methods enable users to find stored images based on the tags associated with each image without looking through every image.

Existing image search techniques do not adequately handle positioning of objects in images when conducting a search query. Conventional image search systems allow users to search for images using keywords which are based on tags associated with images. However, these traditional image search systems are unable to handle searches for images based on a specific background or foreground because the searches combine keywords with logical operators to provide relevant images. As a result, all the images with an object specified in a search query will be provided regardless of the object's position. Thus, existing search systems cannot easily locate images with objects or features at a specific position. As a result, conventional systems may not evaluate any other criteria besides tagged keywords associated with images when performing a search.

SUMMARY

Embodiments of the present invention relate to, among other things, providing search results based on an association of keywords and their corresponding depth-level in an image. At a high level, embodiments of the present invention access images and identify keywords and depth-levels in each image to generate an image depth-level data structure. In order to generate the image depth-level data structure, objects, features, and attributes of each image are identified and translated into keywords. Additionally, depth-map information for each image is generated or obtained based on whether the image has an embedded depth-map. Depth-maps are used to segment an image into depth-segments. Furthermore, once the depth-segments are identified for a particular image, the keywords associated with each depth-segment can be determined using a trained convolutional neural network model. Subsequently, the keywords associated with each depth-segment are stored with the corresponding image in an image depth-level data structure by comparing the keywords generated for the entire image with the keywords at each depth-level. As such, the image depth-level data structure contains a plurality of images with all the keywords found in each image stored with their corresponding depth-level to allow for complicated queries specifying keywords at specific depth-levels.

To search for and provide search result images based on a depth-level specified in a search query, keywords associated with one or more depth-levels can be used to identify corresponding images in an image depth-level data structure. Initially, to query the image depth-level data structure, the purpose of a search query is determined using an intent classifier to determine whether the search query is directed to a specific depth-level. Subsequently, the keywords in the query are parsed and extracted with the depth-level information based on the results of the intent classifier. Result images matching the keywords and depth-level criteria specified in the search query may be provided from the image depth-level data structure.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 7 is an exemplary table illustrating how a search query is parsed for depth-level based image searching, in accordance with embodiments of the present invention;

DETAILED DESCRIPTION

Figure 1:
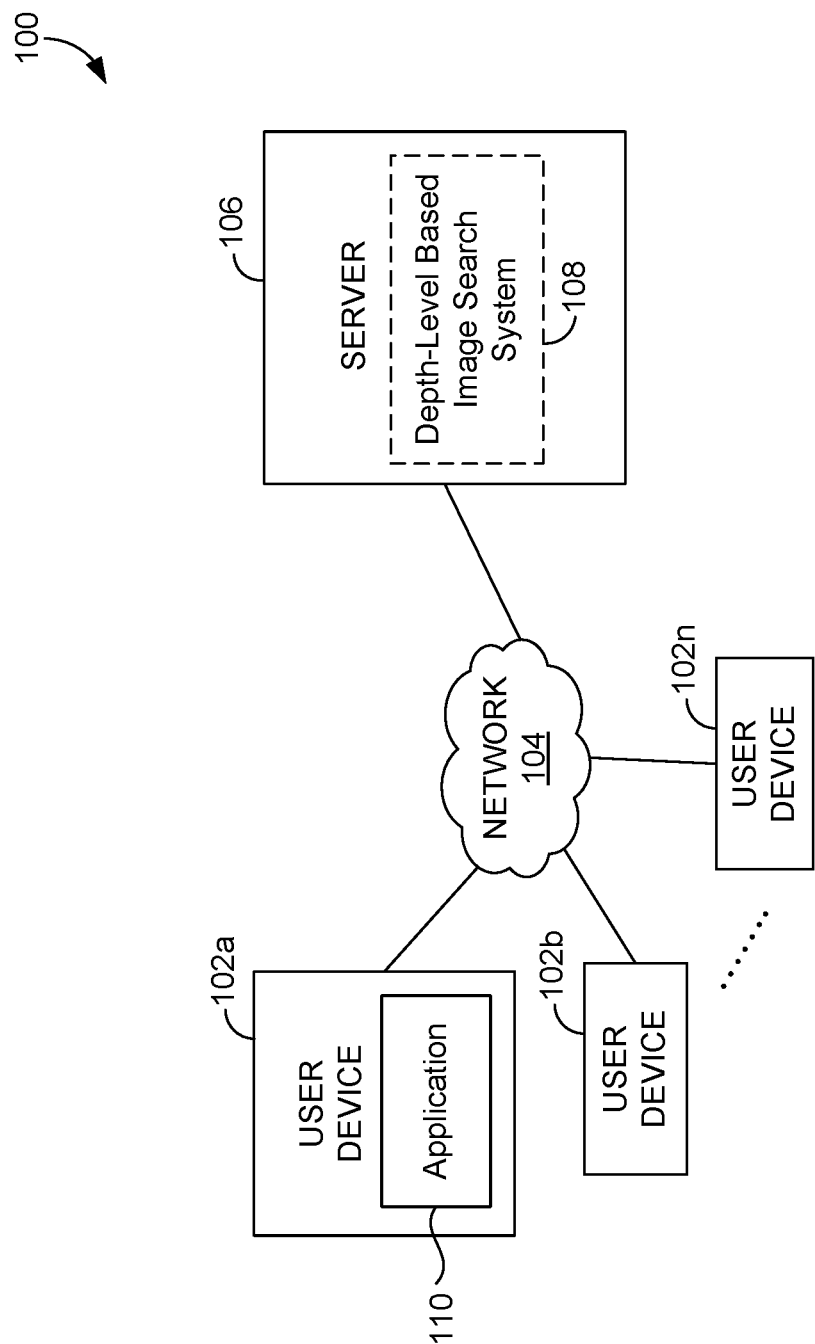
FIG. 1 is a block diagram of an exemplary computing system for image searching using keywords and depth-levels, in accordance with embodiments of the present invention.

Searching for images in an image sharing and storage application is common and a vast majority of image sharing and storage applications include a dedicated search bar. However, these conventional search systems fall short in a number of ways. For instance, conventional image search systems allow users to search for images using keywords which are based on tags associated with images. However, the search results of conventional image search systems may not reflect what a user is looking for. In some cases, search systems use techniques to provide search result images to a user from the user's library of images based on tagged keywords associated with the image. This requires the user to either manually tag images with particular keywords, which is time consuming, or use an automated tagging system that scans and tags images based on the content of the image. As a result, conventional systems may not consider any other criteria besides the tagged keywords associated with images when performing a search.

A common practice for users is to search for images with a specific foreground and/or background. Additionally, users often desire to locate images with particular objects or features in the foreground and/or background of an image. Typically, search systems in image sharing and storage applications enable users to find particular images based on keywords associated with the images, but limitations in these techniques result in the image search system failing to provide adequate search results. In particular, existing image search systems cannot search for images based on the positioning of features or objects within an image unless the image has associated text that indicate the position of objects.

Existing image search engines use text information harvested from webpages to refine image-search results by associating the textual information with an image. For example, if a webpage contains text such as "background," then relevant images from the webpage may be tagged with the keyword "background." This enables the images to be searched based on their tagged keywords. However, these conventional image search services are unable to handle searches for images based on a specific background or foreground because the searches combine keywords with logical operators (e.g., AND, OR, etc.) to provide relevant images based on the search. As a result, a search query for a particular object or feature in the background or foreground of an image will provide all the images with the specified object or feature irrespective of it being in the background or foreground. Thus, existing search systems cannot easily locate images with objects or features at a specific position within an image.

Accordingly, embodiments of the present invention are directed to a depth-level based image search system that addresses these technical challenges by providing search results images based on associations of keywords and depth-levels of an image. At a high level, embodiments of the present invention analyze images in an image library to identify features and objects of images at specific depth-levels. The features and objects of an image are translated into keywords and associated with depth-levels based on depth-segments identified from the image. Associations between the keywords and their corresponding depth-levels for the image are stored among a plurality of images and corresponding associations in an image depth-level data structure. The image depth-level data structure is employed by the depth-level based image search system to facilitate providing search result images based on a search query containing keywords and depth-level information. As a result, the keywords and depth-level information in the search query can be used to query an image depth-level data structure for matching keywords at a specified depth-level in the search query.

More specifically, the depth-level based image search system described herein initially analyzes images from an image library to store information identifying associations between objects and features and depth-levels of an image. This includes translating the features and objects in the image into keywords and identifying their corresponding depth-levels. To efficiently determine the depth-levels of an image, a depth-map for an image is used to identify segments of an image at different depth-levels (i.e., depth-segments) based on an optimal clustering that determines the proper depth-levels for the image. After identifying the depth-segments of an image, each depth-segment of the image is analyzed to identify keywords associated with each of the depth-segments. Subsequently, the original image is analyzed to identify keywords associated with the entire image and embodiments of the present invention then iterate through the keywords associated with the entire image and assign a depth-level for each matching keyword at each depth-segment. Accordingly, the image is stored in an image depth-level data structure containing multiple images and their associated keywords and corresponding depth-levels.

The depth-based image search system may query the image depth-level data structure to search for images that contain keywords at a specific depth-level. Initially, when the search system receives a search query with keywords, the purpose of the search query is determined. In particular, a trained intent classifier is used to categorize the search query to determine whether the query is intended to search for a keyword at a specific depth-level. After determining the intent of the search query, a rule-based approach is used to extract the keywords and corresponding depth-levels from the search query to create a search query map. For example, a search query for an image with a "mountain in background" would be used to create a search query map associating the keyword "mountain" with a depth-level of 2. As such, the search query map can be used to retrieve images from the image depth-level data structure which match the keyword and specified depth-level of the search query.

Thus, the depth-level based search system described herein can provide search result images based on querying an image depth-level data structure for images that contain objects, features, or attributes at a particular depth-level. As a result, the depth-level based search system enables users to easily find images with objects, features, or other attributes at a specific depth-level, such as the background or foreground. Advantageously, embodiments of the present invention do not rely on contextual information from the text on webpages or captions of images to locate images for a user based on specified depth-level. Thus, the present techniques provides accurate search results for depth-level based searches.

Having briefly described an overview of aspects of the present invention, various terms used throughout this description are provided. Although more details regarding various terms are provided throughout this description, general descriptions of some terms are included below to provide a clear understanding of the ideas disclosed herein.

A depth-map or depth-map information of an image generally refers to a grayscale image that contains information about the distance between the surfaces of an object from a given viewpoint. The grayscale image contains pixel values ranging between 0 and 255. A pixel value of 0 (i.e., black) indicates the farthest surface while a pixel value of 255 (i.e., white) represents the nearest surfaces.

A depth-level generally refers to a numerical value indicating the closeness of surfaces of objects in an image from a given viewpoint based on depth-map information associated with the image. For example, there are usually two depth-levels in an image: the background and foreground. The foreground of an image would have a depth-level value of 1 and the background of the image would have a depth-level of 2. The depth-level of an image is usually determined based on the number of identified depth-segments of an image. A depth-segment generally refers to a portion of an image that contains a cluster of pixel values in a range that separates the image into segments based on an optimal cluster of pixel values.

An image depth-level data structure generally refers to any data structure capable of storing images and their associated keywords and corresponding depth-level information. For example, a map, index, array, vector, or any other suitable data structure.

A search query map generally refers to a temporary data structure suitable for storing search queries containing words. The information stored in a search query map can be easily extracted and parsed to determine keywords and depth-level information. Generally, the search query map is used for querying an image depth-level data structure to determine if information stored in the search query map matches information stored in the image depth-level data structure.

A keyword generally refers to any object, feature, or attribute of an image that can be represented as a word. The objects, features, or attributes of an image can generally be extracted from an image using any suitable extraction algorithm and stored as word values in an image depth-level data structure or a search query map.

A tag generally refers to a label of an image based on objects, features, or attributes of the image. An image may be tagged using any suitable manual or automated technique. For example, a machine learning algorithm or model can be used to automatically identify objects, features, or attributes in images and generate tags for each image based on the identified objects, features, or attributes.

Example Depth-Level Based Image Search Environment

FIG. 1 depicts a block diagram of exemplary environment 100 suitable for use in implementing embodiments of the invention. Generally, environment 100 is suitable for depth-level based image searching, and among other things, facilitates providing search result images based on associations of keywords and their corresponding depth-levels. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1 is an example of one suitable operating environment. Among other components not shown, operating environment 100 includes a number of user devices, such as user devices 102a and 102b through 102n, network 104, and server(s) 106. Each of the components shown in FIG. 1 may be implemented via any type of computing device, such as one or more of computing device X00 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 for providing search result images based on associations of keywords and their corresponding depth-levels according to the present disclosure. In some implementations, the application(s) comprises a web application, which can run in a web browser, and could be hosted at least partially on the server-side of environment 100. In addition, or instead, the application(s) can comprise a dedicated application, such as an application having image storing or image sharing functionality. In some cases, the application is integrated into the operating system (e.g., as a service and/or program). It is therefore contemplated herein that "application" be interpreted broadly. In some embodiments, the application may be integrated with depth-level based image searching system 108.

In accordance with embodiments herein, the application 110 can facilitate providing search result images based on associations of keywords and their corresponding depth-levels. In particular, an image library is analyzed to identify keywords and associated depth-levels of each image based on identifying keywords at each depth-segment of each image. An image depth-level data structure is generated storing each image along with the identified keywords and their corresponding depth-levels. The image depth-level data structure may be queried to identify images that match keywords and specified depth-level information in a search query. As such, the search result images identified in the image depth-level data structure matching the search query criteria may be provided to a user. For example, application 110 can be used to provide search result images from an image depth-level data structure to a user of the user device 102*a*.

As described herein, server 106 can facilitate providing search result images based on associations of keywords and their corresponding depth-levels to a user via depth-level based image search system 108. Server 106 includes one or more processors, and one or more computer-readable media. The computer-readable media includes computer-readable instructions executable by the one or more processors. The instructions may optionally implement one or more components of depth-level based image search system 108, described in additional detail below. It should be appreciated that while depth-level based image search system 108 is depicted as a single system, in embodiments, it can function as multiple systems capable of performing all the attributes of the system as described.

Depth-level based image search system 108 generally provides search result images based on associations of keywords and their corresponding depth-levels. Depth-level based image search system 108 can be implemented to associate keywords with depth-levels of an image based on identified depth-segments of the image. In this regard, the stored set of keywords and depth-levels for each image may be searched based on a search query and search results (i.e., images) may be provided. The search result images include images stored in the image depth-level data structure that match the keywords and specified depth-level of the search query.

For cloud-based implementations, the instructions on server 106 may implement one or more components of depth-level based image search system 108. Application 110 may be utilized by a user to interface with the functionality implemented on server(s) 106, such as depth-level based image search system 108. In some cases, application 110 comprises a web browser. In other cases, server 106 may not be required, as further discussed with reference to FIG. 2. For example, the components of depth-level based image search system 108 may be implemented completely on a user device, such as user device 102*a*. In this case, depth-level based image search system 108 may be embodied at least partially by the instructions corresponding to application 110.

Thus, it should be appreciated that depth-level based image search system 108 may be provided via multiple devices arranged in a distributed environment that collectively provide the functionality described herein. Additionally, other components not shown may also be included within the distributed environment. In addition, or instead, depth-level based image search system 108 can be integrated, at least partially, into a user device, such as user device 102*a*. Furthermore, depth-level based image search system 108 may at least partially be embodied as a cloud computing service.

Figure 2:
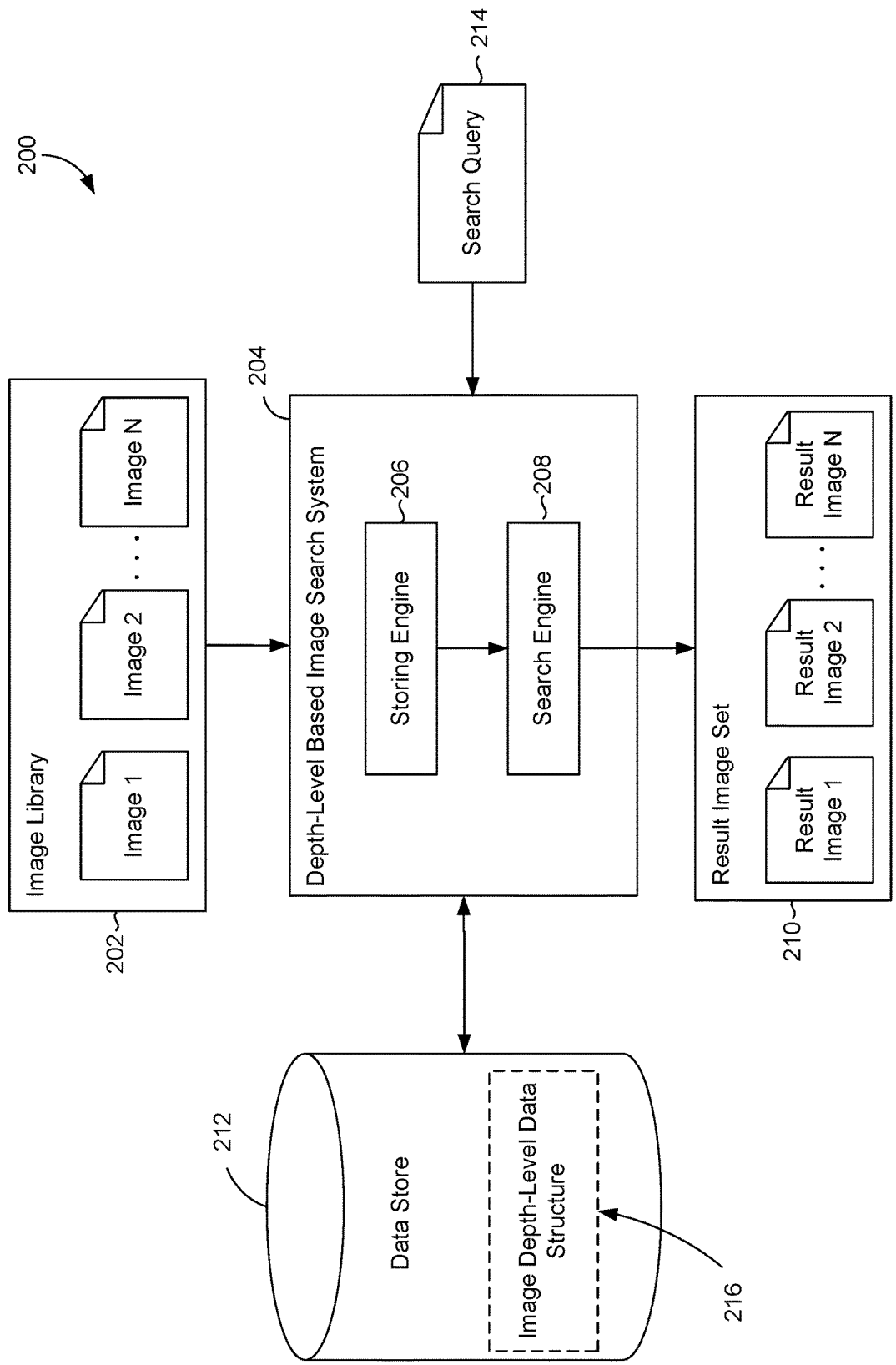
FIG. 2 is a block diagram of an exemplary computing system for image searching based on depth-levels, in accordance with embodiments of the present invention.

Referring to FIG. 2, a block diagram is provided showing an illustrative depth-level based image search environment 200 for providing search result images based on associations of keywords and their corresponding depth-levels. Data store 212 can store computer instructions (e.g., software program instructions, routines, or services), data, and/or models used in embodiments described herein. In some implementations, data store 212 stores information or data relating to images including metadata information as well as an image depth0level data structure 216. Although depicted as a single component, data store 212 may be embodied as one or more data stores. Further, the information in data store 212 may be distributed in any suitable manner across one or more data stores for storage (which may be hosted externally).

In embodiments, data stored in data store 212 includes collected images and related image data. An image generally refers to digital images stored in a computing device as digital data in file formats such JPEG files, PNG files, BMP files, and any other image files. Image data generally refers to any data collected regarding images or any other information images such as metadata information. In some instances, image data may be collected and/or provided by a particular company, retailer, website, user device, or portions thereof. In other instances, image data may be collected and/or provided by an application on a user device. As such image data can include any information relating to images including, but not limited to, metadata information of raw image files such as JPEG files, PNG files, BMP files, and any other image files. One example of the data store is ADOBE® Lightroom, which can store collected images and image data. In some cases, images and image data can be received directly from user devices (including applications on user devices) or from one or more data stores in the cloud. Such data can be received from and sent to depth-level based image search system 204. In other cases, data be received directly from user devices or from one or more data stores in the cloud.

In other embodiments, data store 212 includes an image depth-level data structure 216. An image depth-level data structure 216 can be any data structure capable of storing images and image related data including keywords and depth-level information. For example, in some implementations, image depth-level data structure 216 may be a map containing images and associated keywords and corresponding depth-level information. In other implementations, image depth-level structure 216 may be a table storing images in a first column and associated keywords and corresponding depth-level information in another column in the same row. As such, image depth-level data structure can be easily accessed or sent to depth-level based image search system 204.

The image depth-level data structure 216 can be updated at any time with other images and image related data in data store 212. In some embodiments, Image depth-level data structure 216 may be initially generated by depth-level based image search system 204. In other embodiments, image depth-level data structure 216 may be updated via the components or engines of depth-level based image search system 204. As a result, image depth-level data structure 216 can be generated and/or accessed by depth-level based image search system 204 to provide search result images that are responsive to a search query.

Depth-level based image search system 204 can provide search result images based on associations of keywords and their corresponding depth-levels utilizing image and image related data, an image depth-level data structure 216, or any other data, associated with images gathered by a business intelligence, analytics program(s), data provider, user device, application, or any other product or service. The image and image related data can be utilized by the system to generate an image depth-level data structure 216 that stores images along with identified keywords at a particular depth-level. As such, the depth-level based image search system 204 is capable of providing search result images from the image depth-level data structure 216 that match the keywords and depth-level information in a search query.

As an overview, depth-level based image search system 204 may receive an image library 202, analyze the images in the library to identify keywords and associate the keywords with depth-levels based on the depth-segment location of the keywords, and generate or otherwise update an image depth-level data structure 216 based on the associations between keywords and the depth-levels associated with each corresponding keyword of an image in the library. The image depth-level data structure 216 may be queried using a word-based search query to identify images in the image depth-level data structure that match the keywords and specified depth-level in the search query. In response to the search query, search result images containing matching keywords and depth-level criteria in the image depth-level data structure 216 may be provided.

In this way, to initiate providing search result images based on associations of keywords and their corresponding depth-levels, depth-level based image search system 204 can receive an image library 202. In some cases, image library 202 may be automatically provided. For instance, image library 202 can be sent automatically when, for example, a user uploads images to an image sharing application (e.g., Adobe Lightroom). As another example, image library 202 may be sent to depth-level based image search system 204 when an image sharing application is first installed on a user device. In other cases, an image library may be provided in response to a user's desire to search for particular image using keywords that may or may not contain a specified depth-level.

As contemplated in this disclosure, image library 202 can be updated at any point in time. Updates may include adding or removing images from image library. As such, depth-level based image search system 204 can receive an updated image library 202 at any point in time. For example, depth-level based image search system 204 may receive image library 202 each time an image is added or deleted from library 202. As another example, depth-level based image search system 204 may receive image library 202 at a specified time interval (e.g., every 48 hours). In other cases, depth-level based image search system 204 may receive an updated image library 202 based on a user indication such as an "update" button within an application.

Image library 202 can include any number of images. It is contemplated that image 1 through image N can be any type of image (e.g., JPEG, PNG, TIFF, BMP, GIF, etc.). By way of example, and not limitation, an image in the image library 202 may contain any content, objects, or features within the image. As such, image library 202 can be used to provide search result images based on associations of keywords and their corresponding depth-levels, discussed further below, with reference to storing engine 206 and search engine 208.

Depth-level based image search system 204 can include storing engine 206 and search engine 208. The foregoing components of depth-level based image search system 204 can be implemented, for example, in operating environment 100 of FIG. 1. In particular, these components may be integrated into any suitable combination of user devices 102a and 102b through 102n, and server(s) 106.

Storing engine 206 of depth-level based image search system 204 is generally configured to identify keywords from images in image library 202 and associate keywords identified in the images with their corresponding depth-levels to generate an image depth-level data structure 216. Storing engine 206 initially analyzes images from image library 202 to obtain or generate depth-map information for each image based on a grayscale image of each image. For example, in some instances, images in image library 202 may already have depth-map information embedded in the image's metadata. In other instances, images in image library 202 may need to be processed to compute the depth-map for each image. Deep-learning libraries may be used to compute the depth-map of an image. However, it is contemplated that any suitable method may be used for generating and/or computing the depth-map for an image.

Storing engine 206 also quantizes the depth-map information for each image from image library 202 to extract depth-segments from each image using a K-means clustering algorithm. By converting image data into a vectorized form and running a K-means clustering algorithm on the image data, the optimal depth-segments for an image can be selected. After the quantized depth-segments are identified, the depth-segments are used as a mask to extract corresponding regions from the image that match the depth-segments. The resulting depth-segments of the image are used to assign a depth-level to each keyword identified in the depth-segment. For example, a depth-segment of 1 corresponds to the foreground of an image and a depth-segment of 2 corresponds to the background of an image. In this way, each depth-segment corresponds to a portion of the original image and specifies a depth-level in the image.

Subsequently, storing engine 206 determines keywords associated with each depth-segment along with a corresponding score using a trained convolutional neural network. However, it is contemplated that any suitable method, process, procedure, algorithm, tool, model, or the like may be used to generate the keywords associated with an image based on the objects, features, and content contained in the image. The trained convolutional neural network is also used to determine keywords for the whole image, regardless of the depth-segments, based on the objects, features, and content contained in the image. Subsequently, embodiments of the present invention iterate through the identified keywords in the whole image to determine if a matching keyword exists within the keywords associated with each depth-segment of the image. For matching keywords, the corresponding depth-level associated with the keyword at a particular depth-segment is assigned to the keyword associated with the whole image. In this regard, an image depth-level data structure 212 is generated to store associations between keywords and associated depth-levels for each image.

Search engine 208 can query the image depth-level data structure 216 generated by storing engine 206 to provide result image set 210. For example, in some embodiments, search engine 208 may receive a search query 214 containing a term, list of terms, set of terms, or any other combination of characters. Search query 214 may be any type of character-based search query. For example, search query 214 may be word such as "bridge." As another example, search query 214 may be a phrase such as "boy in front of bridge." As such, search engine 208 of depth-level based image search system 204 can query the image depth-level data structure 216 for images that match the criteria of search query 214.

In embodiments, search engine 208 may determine whether search query 214 contains specified criteria for locating keywords at a specific depth-level of an image. Because search queries can contain an enormous amount of variation, each search query must be analyzed separately by search engine 208 of depth-level based image search system 204 to determine the intent of each individual search query. For example, if search query 214 is "A in front of B," or, alternatively, "B in background of A," search engine 208 must determine that the intent of the two queries is the same by analyzing the keywords and specified depth-level of search query 214. In this regard, search query 214 must be processed by search engine 208 to determine whether a depth-level is specified based on the keywords in search query 214.

In some configurations, a trained, natural language processing (NLP) based intent classifier is used to process user search query 214 to determine whether the query is directed to a specific depth-level. Intent recognition of a search query is used to categorize the search query into a form of intents. Using intent recognition, a search query is analyzed to determine whether the search query is intended for searching for keywords at a specific depth-level. Subsequently, the keywords and associated depth-level information are extracted from search query 214. In some cases, a rule-based approach is used for extracting keywords and the corresponding depth-levels from search query 214. However, any suitable method, process, procedure, algorithm, tool, model, or the like may be used to extract keywords and corresponding depth-levels from a search query. As a result, a search query map is created with the keywords and corresponding depth-levels from search query 214 to determine matching keywords and depth-level information in an image depth-level data structure 216.

Search engine 208 may provide result image set 210 based on the keywords and corresponding depth-level criteria from search query 214 matching the keywords and associated depth-level from the image depth-level data structure 216 generated by storing engine 206. Result image set 210 may contain a set of any number of images from the image depth-level data structure 216 that match with search result images provided by search engine 208.

Figure 3B:
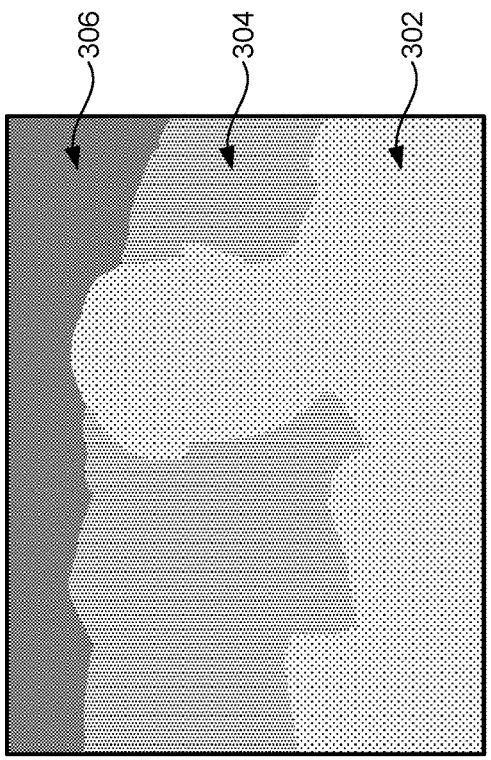
FIG. 3B is an exemplary drawing illustrating a depth-map of the illustrative image in FIG. 3A, in accordance with embodiments of the present invention.
Figure 3A:
FIG. 3A is an exemplary drawing illustrating an image suitable for depth-level based image searching, in accordance with embodiments of the present invention.

Referring now to FIG. 3A, an exemplary drawing illustrating an image that may be used for depth-level based image searching is shown, in accordance with embodiments of the present invention. The image may be any type of image capable of being stored in an image library or image sharing or storage application of a user device. Although not shown for clarity, in some embodiments, the image can be stored on any suitable user device. For example, the image may be stored on a remote server and accessible via an application on a user device such as a desktop computer, cell phone, tablet, smartwatch, or any other device capable of accessing images via an application. The image can be stored as any file format. For example, the image may be stored as a JPEG file, PNG file, or BMP file, among others. In embodiments, the image may be uploaded to an image library or other image sharing or storage application. For example, the image may be stored on a user device such a cell phone. In other embodiments, the image may be stored on a remote server and accessible via an application on a user device such as a desktop computer, cell phone, tablet, smartwatch, or any other device capable of accessing images via an application.

Turning now to FIG. 3B, an exemplary drawing illustrating a depth-map of the illustrative image in FIG. 3A is shown, in accordance with embodiments of the present invention. Generally, a depth-map for an image is a grayscale image that contains information about the distance between surfaces of objects in the image from a given viewpoint. The distance is generally determined using pixel value ranges between 0 and 255. For example, a pixel value of 0 (i.e., black) indicates the farthest surface while 255 (i.e., white) represents the nearest surface.

In some cases, images may already have an associated depth-map. In other cases, a depth-map may have to be generated for a given image with no associated depth-map. For example, in some embodiments, an image may have a depth-map embedded in its metadata when a camera takes a picture. However, in other embodiments, if an image does not contain a depth-map in its metadata, any suitable method for computing the depth-map of the image may be used. For example, a deep-learning model may be used to compute the depth-map for a single image.

The exemplary depth-map shown in FIG. 3B contains three portions representing the various distances of objects in the image. For example, portion 306 contains pixel values closer to 0, portion 304 contains pixel values in the middle approximately at a value of 128, and portion 302 contains pixel values close to 255. Pixel values closer to a value of 0 indicate that objects, features, or content comprised by pixels are farther from the viewpoint of the image. Pixel values closer to a value 255 indicate that objects, features, or content comprised by the pixels are closer to the viewpoint of the image. Alternatively, in some embodiments, depth maps may be constructed such that pixel values closer to 0 indicate that objects, features or content are closer to the viewpoint of the image and pixel values closer to 255 indicate that objects, features, or content, are farther from the viewpoint of the image. Although not shown for clarity, an image may contain any number of pixel value ranges throughout the image. For example, portion 306 of the depth map may contain portions with pixel values closer to 255. In some embodiments, objects in an image may have a pixel value of 0 (e.g., objects that are black or dark in color) but are still in the foreground of the image. In other embodiments, objects in an image may have a pixel value of 255 (e.g., objects that are white or light in color) but are still in the background of the image. In either embodiment, the pixel values of the objects are changed such that their pixel value reflects their distance from the viewpoint of the image instead of the color of the object itself. As a result, the pixel values of an image indicate how close the objects, features, or content comprised by the pixel values are to a given viewpoint of the image.

Figure 3C:
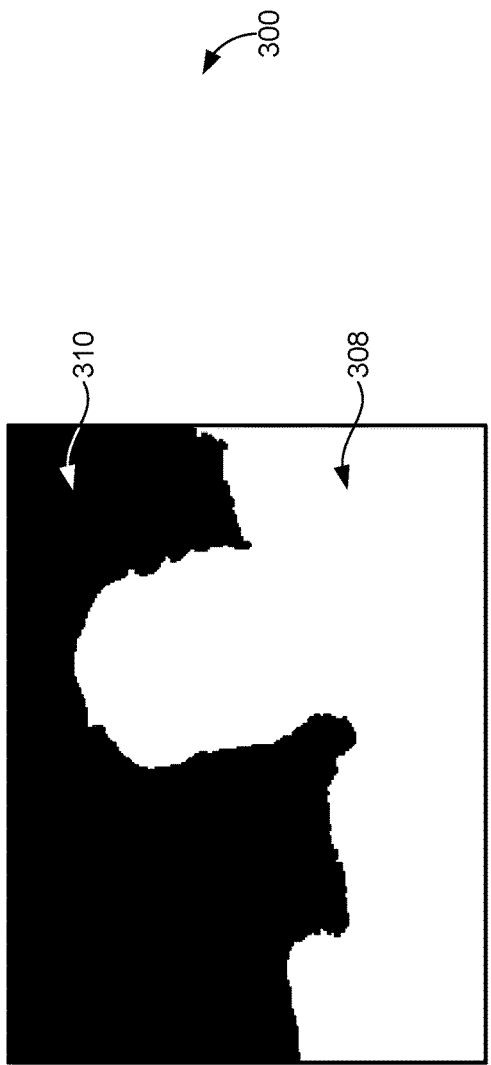
FIG. 3C is an exemplary drawing illustrating a quantized depth-segment mask based on the depth-map in FIG. 3B and the illustrative image in FIG. 3A, in accordance with embodiments of the present invention.

Referring now to FIG. 3C, FIG. 3C shows an exemplary drawing illustrating a depth-segment based on the depth-map of the illustrative image in FIG. 3B and the illustrative image in FIG. 3A. Using a depth-map of an image, quantized depth-segments of an image are calculated. The image in FIG. 3C shows that the image from FIG. 3A contains two quantized depth-segments: quantized depth-segment 308 and quantized depth-segment 310. However, it is contemplated that in some embodiments, there may be more than two quantized depth-segments. In this example, quantized depth-segment 308 represents the foreground of the image described in conjunction with FIG. 3A and depth-segment 310 represents the background of the image described in conjunction with FIG. 3A. As a result, depth-segments of an image can be used to separate an image into various depth-levels.

Depth-segment 308 and depth-segment 310 are identified using a number of steps based on depth-map information. Initially, image data, such as the depth-map generated in FIG. 3B from the image in FIG. 3A, is converted into a vectorized form of dimensions (e.g., (width×height, 1)). Subsequently, a clustering algorithm, such as K-means clustering, is run on the vectorized data using a number of configurations. The clustering algorithm aims to partition n observations into k sets to minimize intra-cluster variance (i.e., minimize the within-cluster variance). For example, K=n, where n={1, 2, 3, 4}, assuming the maximum possible depth levels for an image is 4. In addition, a Euclidian distance is used as a distance metric to partition the observations. The clustering algorithm produces the clusters of pixel values for each configuration (e.g., K=1, 2, 3, 4). In this case, each cluster represents a unique depth-segment of the image. Embodiments of the present invention then select the optimal value of K as the one producing the minimum intra-cluster variance. As a result, this produces the optimal number of clusters. For example, if the optimal value of K is 2, then 2 optimal clusters are selected, as shown in FIG. 3C which represents a separation between the background and foreground.

Figure 4B:
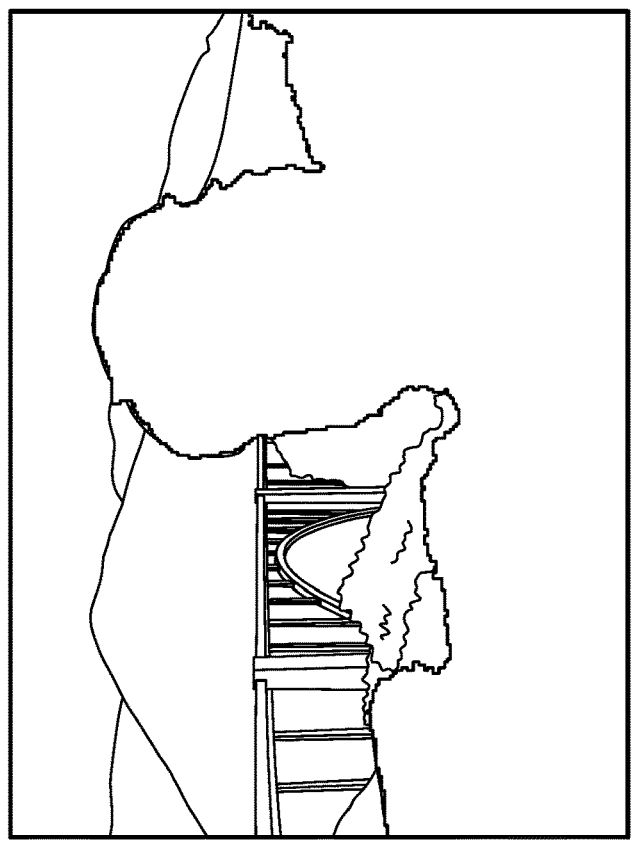
FIG. 4B is an exemplary drawing illustrating a second depth-segment of the illustrative image in FIG. 3A based on the illustrative depth-segment mask in FIG. 3C, in accordance with embodiments of the present invention.
Figure 4A:
FIG. 4A is an exemplary drawing illustrating a first depth-segment of the illustrative image in FIG. 3A based on the illustrative depth-segment mask in FIG. 3C, in accordance with embodiments of the present invention.

Turning now to FIGS. 4A and 4B, exemplary drawings are provided illustrating a first depth-segment (FIG. 4A) and a second depth-segment (FIG. 4B) of the illustrative image in FIG. 3A based on the illustrative depth-segments in FIG. 3C, in accordance with embodiments of the present invention. For example, the depth-segment in FIG. 4A is based on depth-segment 308 being used as a mask to extract the corresponding portions of the image in FIG. 3A. Alternatively, the depth-segment in FIG. 4B is based on depth-segment 310 being used as a mask to extract the corresponding portions of the image in FIG. 3A. Each depth-segment has a corresponding value for a depth-level. In general, the higher the value of the depth-level, the farther away the depth-level. For example, a depth-level of 1 may indicate the foreground of the image and a depth-level of 2 may indicate the background of the image. Thus, as the value of the depth-level associated with a keyword increases, the farther away the keyword is from the viewpoint of the image. For example, the depth-segment in FIG. 4A corresponds to a depth-level of 1 indicating that it is the foreground of the image in FIG. 3A. As another example, the depth-segment in FIG. 4B corresponds to a depth-level of 2 indicating that it is the background of the image in FIG. 3A. As such, the image in FIG. 3A is divided into two depth-segments representing the background and foreground of the image.

Figure 5A:
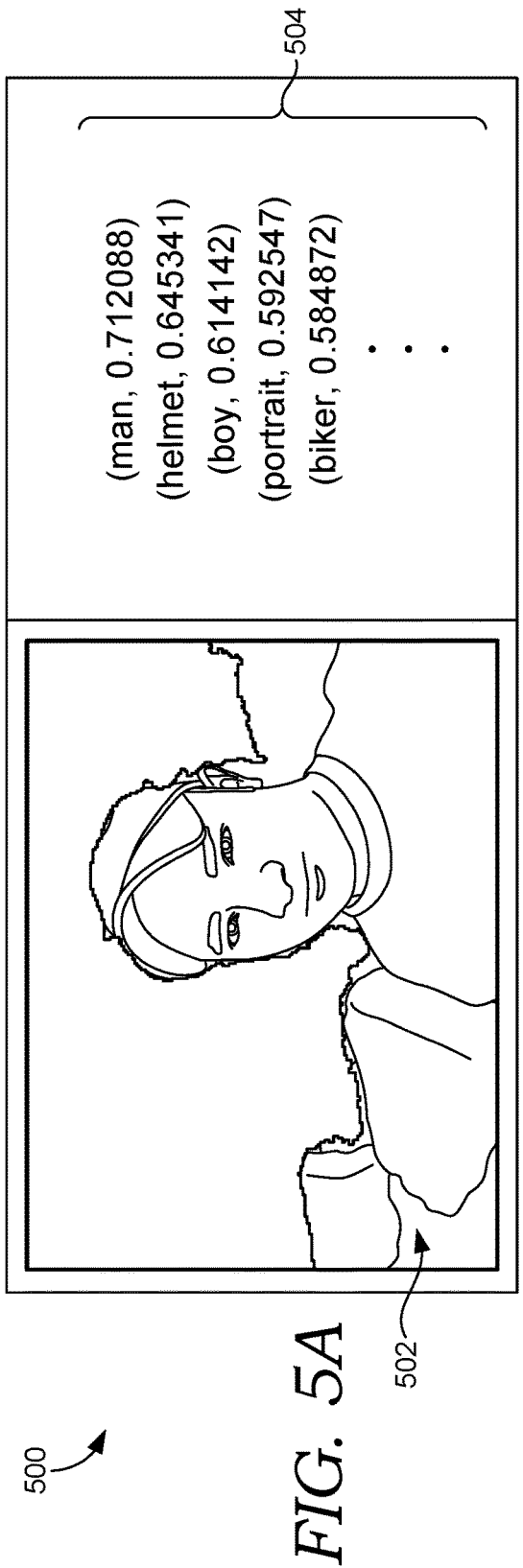
FIG. 5A is an exemplary drawing and table illustrating keywords identified with an associated depth-segment, in accordance with embodiments of the present invention.
Figure 5B:
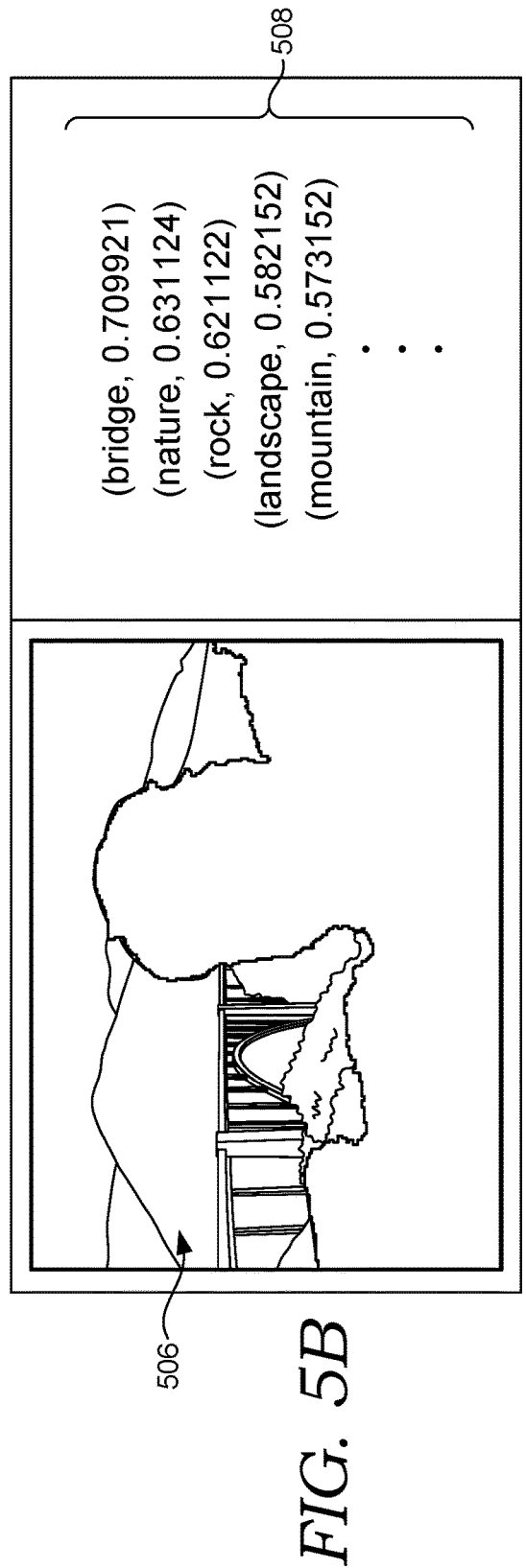
FIG. 5B is an exemplary drawing and table illustrating keywords identified with an associated depth-segment, in accordance with embodiments of the present invention.

Referring now to FIGS. 5A and 5B, exemplary tables are provided illustrating keywords identified with an associated depth-segment identified in FIGS. 4A and 4B, in accordance with embodiments of the present invention. Once the depth-segments for an image are determined, the keywords (i.e., tags) associated with each depth-segment must be determined. As a result, each depth-segment of an image contains associated keywords that represent objects, features, or other content in the corresponding depth-segment.

In some embodiments, the keywords are generated using a convolutional neural network (CNN) model pre-trained on a large image dataset (although it is contemplated that any suitable model, algorithm, method, process, procedure or the like may be used for generating the keywords based on image content). For example, using a CNN, keyword set 504 with corresponding scores are generated for depth-segment 502 in FIG. 5A. Additionally, keyword set 508 with corresponding scores are generated for depth-segment 506 in FIG. 5B. The keywords in keyword set 504 refer to objects, features, or other content that may be found within depth-segment 502 and the keywords in keyword set 508 refer to objects, features, or other content that may be found within depth-segment 506. As a non-limiting example, keywords 504 contains keywords such as "man," "helmet," and "boy," among others shown. Although not shown for clarity, any number of keywords with corresponding scores in a keyword set may be associated with a depth-segment.

Each keyword identified from a depth-segment contains a corresponding score. The score produced by the CNN indicates a confidence level that the object, feature, or content is contained in the depth-segment of an image. As a result, keyword set 504 and keyword set 508 may be ordered according to the scores of the keywords identified in their corresponding depth-segments. For example, the keywords may be ordered from the highest scores to the lowest scores. As such, the most relevant features may be at the top of the set.

Figure 6:
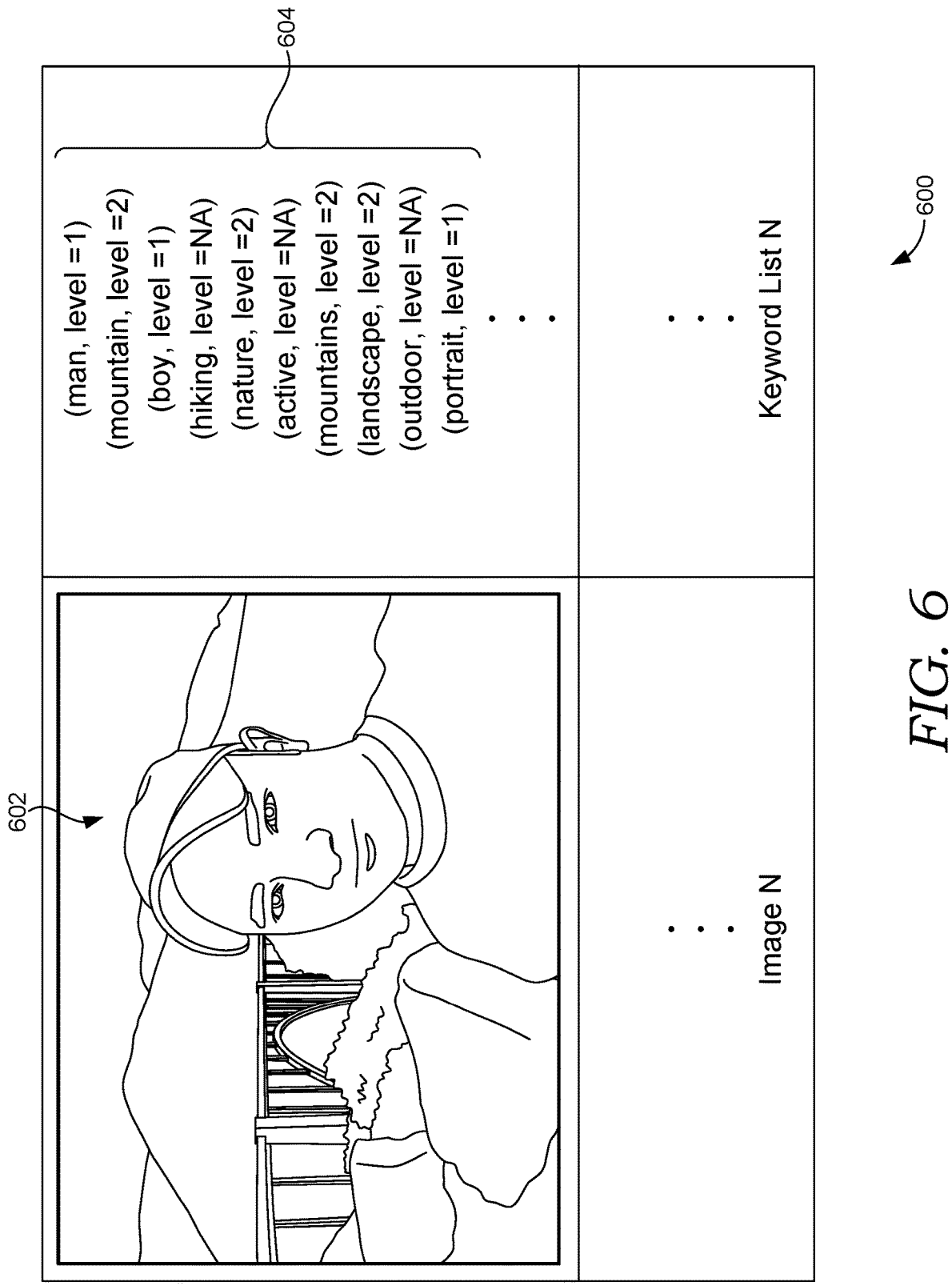
FIG. 6 is an exemplary drawing and table illustrating an entry in an image depth-level data structure, in accordance with embodiments of the present invention.

Turning now to FIG. 6, FIG. 6 shows an exemplary table illustrating an element of an image depth-level data structure, in accordance with embodiments of the present invention. The table shows a representation of an element in an image depth-level data structure which contains an image and its associated keywords and their corresponding depth-levels based on the depth-segments of the keywords previously identified. Although not shown for clarity, the image depth-level data structure may contain any number of images with associated keywords and their corresponding depth-levels. In order to generate the image depth-level data structure, keywords (i.e., tags) must first be generated for whole image 602, which is the same image as described at least in conjunction with FIG. 3A. As mentioned in conjunction with at least FIGS. 5A and 5B, a CNN model or any other method, algorithm, process, or procedure can be used to generate keywords for image 602.

Subsequently, the identified keywords for a whole image are iterated to determine if a keyword exists within the keyword sets associated with the depth-segments of the image. For example, if a keyword generated in keyword set 604 for image 602 is "man," then the keyword set 504 associated with depth-segment 502 and the keyword set 508 associated with depth-segment 506 are iterated to determine if the keyword "man" exists in either keyword set 504 or 508. If a match occurs, then the keyword is assigned the corresponding depth-level based on the depth-segment that the matching keyword was associated with. Alternatively, if a keyword in keyword set 604 for whole image 602 does not appear in a keyword set associated with a depth-segment of the image, then no depth-level may be assigned to the keyword. For example, the keyword "active" in keyword set 604 has its depth-level set to "NA" indicating that there is no depth-level assignment. As a result, an image depth-level data structure is generated containing any number of images, each image containing a set of keywords and their corresponding depth-levels.

Once keywords and corresponding depth-level information is stored in an image depth-level data structure, the image depth-level data structure may be queried for images that contain keywords at particular depth-levels. In general, a search query can be received and analyzed to determine if the query is directed to a search for a keyword at a particular depth-level (e.g., background or foreground). In some instances, the queries can be worded differently but are still searching for keywords at the same depth-level for each. For example, if a search query specifies "A in front of B" or "B in the background of A," both queries are analyzed to determine that the search query is looking for keywords A and B at particular depth-levels. As such, understanding the purpose of a search query is necessary to determine the keywords in the query and the whether or not a depth-level is specified in the search query.

Recognizing the purpose of a search query is a two-step process that requires determining the intent of a query and extracting the keywords from the search query using an intent classifier. In some embodiments, a trained natural language processing (NLP) based intent classifier is used to determine an intent of a search query. Initially, embodiments of the present invention use intent recognition to categorize a search query into a form of intents. Using intent recognition, embodiments of the present invention determine whether a query is intended for searching a keyword at a specific depth-level. In some embodiments, a binary classification model is used for intent recognition. It is contemplated that any suitable supervised binary classification model (e.g., SVM, Logistic Regression, Neural Network, etc.) may be used to determine the intent of a search query. As such, the purpose of a search query is determined based on the intent of search query.

Embodiments of the present invention use a single intent named PositionQuery to represent whether a search query is directed to a depth-level based search. For example, if a search query is analyzed using an intent classifier, and it is determined that the search query is looking for keywords at a specific depth-level, the value of PositionQuery would be set to 1. However, if a search query is analyzed using an intent classifier, and it is determined that the search query is not looking for keywords at a specific depth-level, the value of PositionQuery would be set to 0. As a result, the intent of a search query may be used to determine a proper grammar used to extract keywords from the search query.

After determining the intent of a search query, keywords and associated depth-level information are extracted from the search query. Embodiments of the present invention use a rule-based approach to extract the keywords and corresponding depth-level information from a search query. This requires defining a grammar to recognize features of a string such as keywords, positional phrases, and logical combiners. For example, keywords are regular search words such as "bridge" and "mountain." Positional phrases are compound words such as "in the background of," "in front of," "behind," etc. Logical combiners are words like "and", "or," etc. Embodiments of the present invention create a dictionary for all supported keywords and positional phrases. The dictionary enables recognition of particular keywords, positional phrases, and logical combiners. Along with the defined grammar and generated dictionary, a rule-set is generated for parsing a search query. For example, a regular expression-based rule may be used such as: {<KEYWORD_L1>+[<AND> ? <KEYWORD_L1>]*<FG_POS> <KEYWORD_L2> ?}. This rule enables embodiments of the present invention to parse queries such as "A in foreground", "A in front of B", "A and B in front of C", etc. The parsed search query is used to generate a search query map of keywords and associated depth-level information. As a result, the defined grammar, dictionary, and rule-set assist embodiments of the present invention in parsing a search query for keywords and depth-level information.

Referring now to FIG. 7, FIG. 7 shows an exemplary table illustrating how a search query is parsed for depth-level based image searching, in accordance with embodiments of the present invention. Column 702 shows example search queries that may be entered by a user. For example a user may enter "bridge" or "mountain in background." Column 704 demonstrates the intent determined for each associated search query. For example, the intent, represented by the PositionQuery variable, of the search query "bridge" is 0 indicating that the search query does not contain depth-level based words or phrases. As another example, the intent of the search query for "mountain in background" is 1, indicating that the search query contains depth-level based words or phrases. After determining an intent and parsing a search query, a search query map is generated in column 706 for each search query in column 702 with keywords from the search query and associated depth-levels. For example, the search query "mountain in background" may be in a search query map that contains the keyword variable and associated depth-level information (e.g., [(mountain, level=2)]). Thus, using a search query map, images from an image depth-level data structure can be provided whose keyword and depth-level criteria match that of the search query. As a result, embodiments of the present invention support depth-level based image searching.

Example Flow Diagrams

Figure 8:
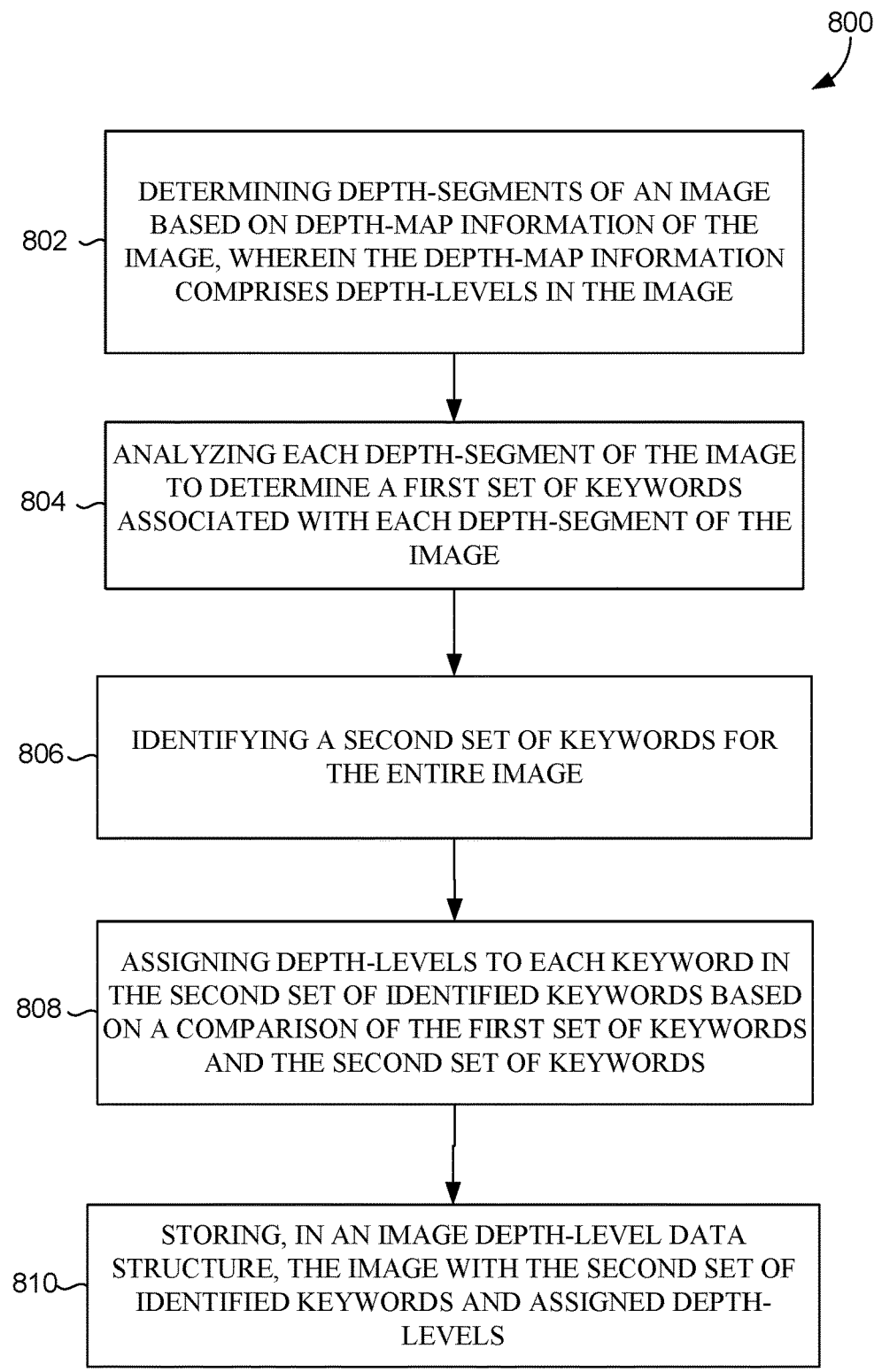
FIG. 8 is a flow diagram showing a method for generating an image depth-level data structure for searching images based on depth-levels, in accordance with embodiments of the present invention.
Figure 9:
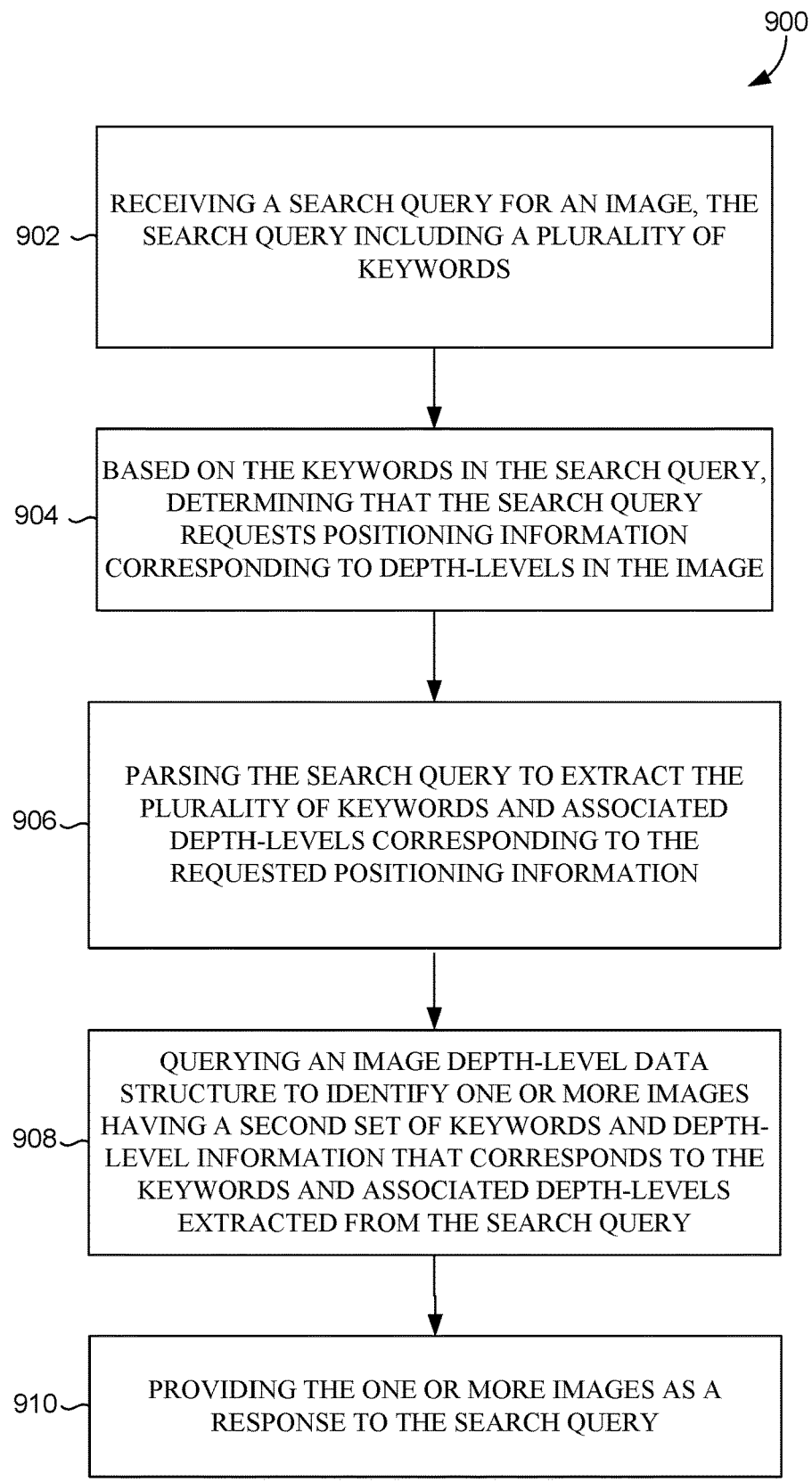
FIG. 9 is a flow diagram showing a method for searching images based on depth-levels using an image depth-level data structure, in accordance with embodiments of the present invention.

With reference now to FIGS. 8 and 9, flow diagrams are provided illustrating methods 800 and 900 for providing product recommendations. Each block of methods 800 and 900, and any other methods described herein, comprise a computing process performed using any combination of hardware, firmware, and/or software. For instance, various functions can be carried out by a processor executing instructions stored in memory. The methods can also be embodied as computer-usable instructions stored on non-transitory computer storage media. The methods can be provided by a standalone application, a service or hosted service (standalone or in combination with another hosted service), or a plug-in to another product, to name a few. The methods 800 and/or 900 may be implemented by depth-level based image search system 204 as described in conjunction with at least FIGS. 1-7.

Turning initially to FIG. 8, FIG. 8 illustrates a method 800, in accordance with embodiments described herein. Method 800 can be performed, for instance, by storing engine 206 of FIG. 2. Initially, as shown at block 802, depth-segments of an image are determined based on depth-map information of the image. The depth-map information is comprised of depth-levels in the image. At block 804, each depth-segment of the image is analyzed to determine a first set of keywords associated with each depth-segment of the image. As shown, at block 806, a second set of keywords are identified for the entire image. At block 808, depth-levels are assigned to each keyword in the second set of identified keywords based on a comparison of the first set of keywords and the second set of keywords. At block 810, the image with the second set of identified keywords and assigned depth-levels are stored in an image depth-level data structure.

Referring now to FIG. 9, FIG. 9 illustrates a method 900, in accordance with embodiments described herein. Method 900 can be performed, for instance, by search engine 208 of FIG. 2. Initially at block 902, a search query for an image is received. The search query including a plurality of keywords. At block 904, based on the keywords in the search query, it is determined that the search query requests positioning information corresponding to depth-levels in the image. At block 906, the search query is parsed to extract the plurality of keywords and associated depth-levels corresponding to the requested positioning information. At block 908, an image depth-level data structure is queried to identify one or more images having depth-level information that corresponds to the keywords and associated depth-levels extracted from the search query. At block 910, the one or more images are provided as a response to the search query.

Example Operating Environment

Figure 10:
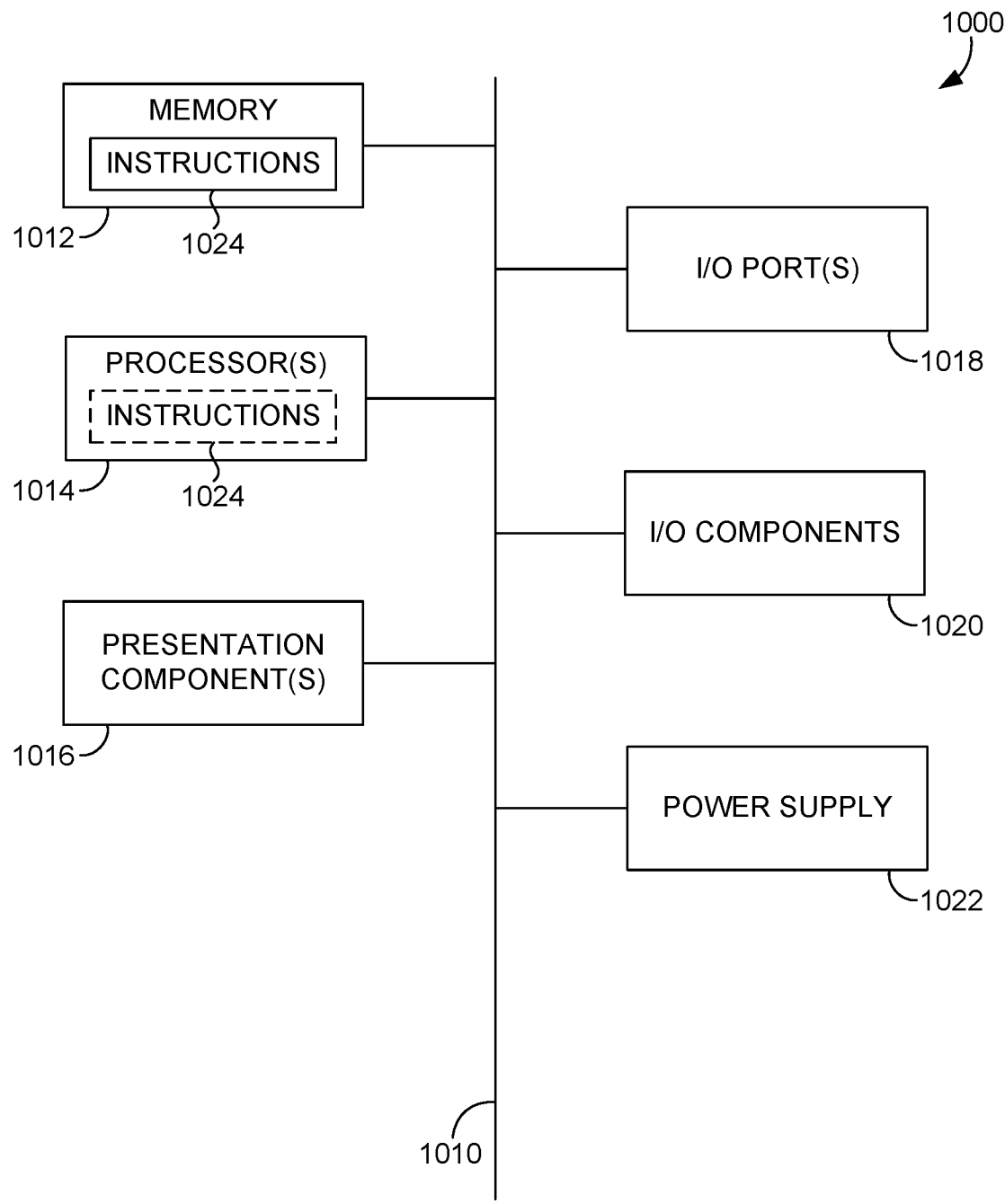
FIG. 10 is a block diagram of an exemplary operating environment in which embodiments of the present invention may be employed.

Having briefly described an overview of embodiments of the present invention, an example operating environment in which embodiments of the present invention may be implemented is described below in order to provide a general context for various aspects of the present invention. Referring initially to FIG. 10 in particular, an example operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10 computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of non-transitory computer-readable media. Non-transitory computer-readable media can be any available media that can be accessed by computing device 1000 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 700 to be logically coupled to other devices including I/O components 1020, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A computer-implemented, the method comprising:
   determining depth-segments of an image based on depth-map information of the image, wherein the depth-map information comprises depth-levels in the image and the depth-segments separate the image into segments based on a cluster of pixel values from the depth-map information such that the cluster produces a minimum variance;
   analyzing each depth-segment of the image to determine a corresponding first set of keywords derived from the corresponding depth-segment of the image, wherein each first set of keywords describe at least one of an object, a feature, and an attribute included in the corresponding depth-segment of the image;
   identifying a second set of keywords for the image in its entirety, wherein the second set of keywords describe the at least one of the object, the feature, and the attribute included in the image;
   assigning depth-levels to each keyword in the second set of identified keywords based on a comparison of the first set of keywords and the second set of keywords and based on the corresponding depth-segment from which the first set of keywords was derived; and
   storing, in an image depth-level data structure, the image with the second set of identified keywords and assigned depth-levels.

2. The method of claim 1, further comprising computing the depth-map information for the image based on whether depth-map information is contained in metadata of the image.

3. The method of claim 1, wherein determining the depth-segments of the image further comprises identifying a number of depth-surfaces of the image using a generated mask for each depth-segment.

4. The method of claim 3, wherein generating the mask for each depth-segment further comprises:
- converting data of the image into a vectorized form;
- clustering the vectorized form of data to produce a number of clusters for each depth-level of the image;
- comparing the variance between each depth-level of the image for each cluster;
- selecting the number of clusters for each depth-level producing minimum variance; and
- generating the mask for each depth-segment based on the selected number of clusters.

5. The method of claim 3, wherein the generated mask is used to extract one or more regions from the image as the depth-segments based on regions outlined by the generated mask.

6. The method of claim 1, wherein analyzing each depth-segment of the image to determine the keywords further comprises generating keyword proposals using a trained convolutional neural network model, the keyword proposals having an associated score indicating a level of certainty that the keyword is in the depth-segment of the image.

7. The method of claim 1, wherein the depth-levels comprise values indicating a depth position in the image.

8. The method of claim 1, wherein assigning the depth-levels to each keyword in the second set of identified keywords further comprises:
- identifying keywords in the second set of identified keywords that match the keywords in the first set of keywords; and
- assigning the depth-level associated with each matching keyword in the first set of keywords to the matching keyword in the second set of keywords.

9. The method of claim 1, further comprising querying the image depth-level data structure for one or more images based on one or more keywords and depth-level information in a search query.

10. The method of claim 9, wherein querying the image depth-level data structure further comprises comparing the one or more keywords and depth-level information in the search query to the keywords in the second set of keywords and the associated depth-level information in the image depth-level data structure to determine a match.

11. One or more computer storage media having computer-executable instructions embodied thereon that, when executed, by one or more processors, cause the one or more processors to perform a method, the method comprising:
- receiving a search query for an image, the search query including a plurality of keywords that describe at least one of an object, a feature and an attribute;
- determining that the search query requests positioning information corresponding to depth-levels in the image;
- parsing the search query to extract the plurality of keywords and associated depth-levels corresponding to the requested positioning information;
- querying an image depth-level data structure to identify one or more images having a second set of keywords and depth-level information that corresponds to the keywords and associated depth-levels extracted from the search query; and
- providing the one or more images as a response to the search query.

12. The one or more computer storage media of claim 11, wherein determining the positioning information of the search query further comprises determining an intent of the search query, the intent indicating whether the search query is directed to a depth-level.

13. The one or more computer storage media of claim 11, wherein parsing the search query further comprises:
- using a defined grammar and a dictionary comprising keywords, positional phrases, and logical combiners; and
- extracting the plurality of keywords and depth-level information based on a rule set, the defined grammar, and the dictionary.

14. The one or more computer storage media of claim 11, wherein the image depth-level data structure comprises a plurality of images with stored associations between keywords and depth-level information for each image of the plurality of images.

15. The one or more computer storage media of claim 11, wherein depth-levels comprise values indicating a depth-position in the image.

16. A depth-level based image search system for providing search result images, the system comprising:
- one or more hardware processors; and
- one or more non-transitory computer storage media storing computer-useable instructions that, when used by the one or more processors, cause the one or more processors to execute:
- a means for storing, in an image depth-level data structure, keywords and depth-level information of a plurality of images by analyzing depth-segments of each image in the plurality of images to determine the keywords and the associated depth-level information, wherein the depth-segments separate the image into segments based on a cluster of pixel values from the depth-map information and the depth-map information comprises depth-levels in the image such that the cluster produces minimum variance; and
- a means for querying the image depth-level data structure using the depth-level information in the image depth-level data structure based at least on a search query containing keywords and positioning information corresponding to depth-levels to provide one or more search result images from the image depth-level data structure.

17. The system of claim 16, wherein analyzing depth-segments of the image further comprises:
- Identifying the depth-segments of the image based on depth-map information of the image, wherein the depth-map information comprises depth-levels in the image; and
- analyzing each depth-segment of the image to determine keywords associated with each depth-segment of the image.

18. The system of claim 16, wherein querying the image depth-level data structure further comprises:
- determining that the search query requests positioning information corresponding to depth-levels; and
- identifying the positioning information in the search query, the positioning information comprising an identified number of depth-levels.

19. The system of claim 18, wherein determining that the search query requests positioning information further comprises determining an intent of the search query, the intent indicating whether the search query is directed to a depth-level.

20. The system of claim 18, wherein identifying positioning information from the search query further comprises parsing the search query to identify the keywords and the depth-level information.

* * * * *

UNITED STATES PATENT AND TRADEMARK OFFICE
CERTIFICATE OF CORRECTION

Page 1 of 1

PATENT NO. : 11,514,102 B2
APPLICATION NO. : 16/541039
DATED : November 29, 2022
INVENTOR(S) : Gupta et al.

It is certified that error appears in the above-identified patent and that said Letters Patent is hereby corrected as shown below:

On the Title Page

Item (72) Inventors:
Change "Fooghly (IN)" to --Hooghly (IN)--.

Signed and Sealed this
Seventh Day of February, 2023

Katherine Kelly Vidal
*Director of the United States Patent and Trademark Office*